US009194287B1

(12) United States Patent
Bon et al.

(10) Patent No.: US 9,194,287 B1
(45) Date of Patent: Nov. 24, 2015

(54) DOUBLE CAM AXIAL ENGINE WITH OVER-EXPANSION, VARIABLE COMPRESSION, CONSTANT VOLUME COMBUSTION, ROTARY VALVES AND WATER INJECTION FOR REGENERATIVE COOLING

(71) Applicants: Bernard Bon, Whittier, CA (US); Jorge Martins, V.N.Gaia (PT); Francisco Brito, Braga (PT); Tiago Costa, Nova de Famalico (PT)

(72) Inventors: Bernard Bon, Whittier, CA (US); Jorge Martins, V.N.Gaia (PT); Francisco Brito, Braga (PT); Tiago Costa, Nova de Famalico (PT)

(*) Notice: Subject to any disclaimer, the term of this patent is extended or adjusted under 35 U.S.C. 154(b) by 0 days.

(21) Appl. No.: 14/633,330

(22) Filed: Feb. 27, 2015

Related U.S. Application Data

(60) Provisional application No. 62/123,710, filed on Nov. 26, 2014.

(51) Int. Cl.
*F02B 75/04* (2006.01)
*F02B 75/26* (2006.01)
*F01B 3/00* (2006.01)
*F01B 3/02* (2006.01)

(52) U.S. Cl.
CPC .............. *F02B 75/26* (2013.01); *F01B 3/0026* (2013.01); *F01B 3/02* (2013.01); *F02B 75/041* (2013.01)

(58) Field of Classification Search
CPC ........ F02B 75/26; F02B 75/04; F01B 3/0026; F01B 3/06
USPC ........... 123/48 R, 78 R, 78 B, 78 BA, 48 AA, 123/190.17, 190.8; 701/103, 104
See application file for complete search history.

(56) References Cited

U.S. PATENT DOCUMENTS

| 3,151,528 | A |   | 10/1964 | Eastman |   |
|---|---|---|---|---|---|
| 4,517,931 | A | * | 5/1985 | Nelson | F02B 41/04 123/197.4 |
| 4,553,508 | A | * | 11/1985 | Stinebaugh | F02B 75/26 123/332 |
| 4,736,715 | A | * | 4/1988 | Larsen | F01L 1/34 123/25 C |
| 4,848,282 | A | * | 7/1989 | Chaneac | F01B 1/0648 123/55.3 |
| 4,852,532 | A |   | 8/1989 | Bishop |   |
| 5,553,574 | A | * | 9/1996 | Duncalf | F01B 1/062 123/197.3 |
| 6,279,520 | B1 | * | 8/2001 | Lowi, Jr. | F01B 3/045 123/56.1 |
| 6,343,575 | B1 | * | 2/2002 | Deckard | F01B 3/04 123/43 R |
| 7,305,963 | B2 | * | 12/2007 | Zak | F01C 3/02 123/228 |
| 7,409,932 | B2 | * | 8/2008 | Gaiser | F01B 9/06 123/56.2 |
| 8,086,386 | B2 |   | 12/2011 | Bakharev |   |
| 2006/0157017 | A1 | * | 7/2006 | Bortone | F01C 1/077 123/241 |

(Continued)

FOREIGN PATENT DOCUMENTS

WO    WO 97/04225    2/1997

*Primary Examiner* — Lindsay Low
*Assistant Examiner* — Long T Tran
(74) *Attorney, Agent, or Firm* — Kenneth L. Green; Averill & Green

(57) ABSTRACT

An axial engine includes a cam assembly housing moveable away from a cylinder head to reduce a compression ratio during conditions giving rise to detonation and movable towards the cylinder head to raise the compression ratio when operation allows the higher compression ratio. Piston rod ends ride in counter rotating slots balancing lateral forces on the piston rods. Piston dwell at Top Dead Center (TDC) provides for constant volume combustion and extended piston travel during the power stroke allows for over-expansion. Rotary valves improve volumetric efficiency and water injection supports increased compression ratio leading to improved thermodynamic efficiency.

18 Claims, 7 Drawing Sheets

(56) References Cited

U.S. PATENT DOCUMENTS

2007/0181085 A1* 8/2007 Gaiser .................. F01B 9/06 123/56.2

2012/0234297 A1* 9/2012 McAlister ............... F01B 1/062 123/47 R

2013/0276761 A1* 10/2013 Ho ........................ F02B 75/282 123/51 R

* cited by examiner

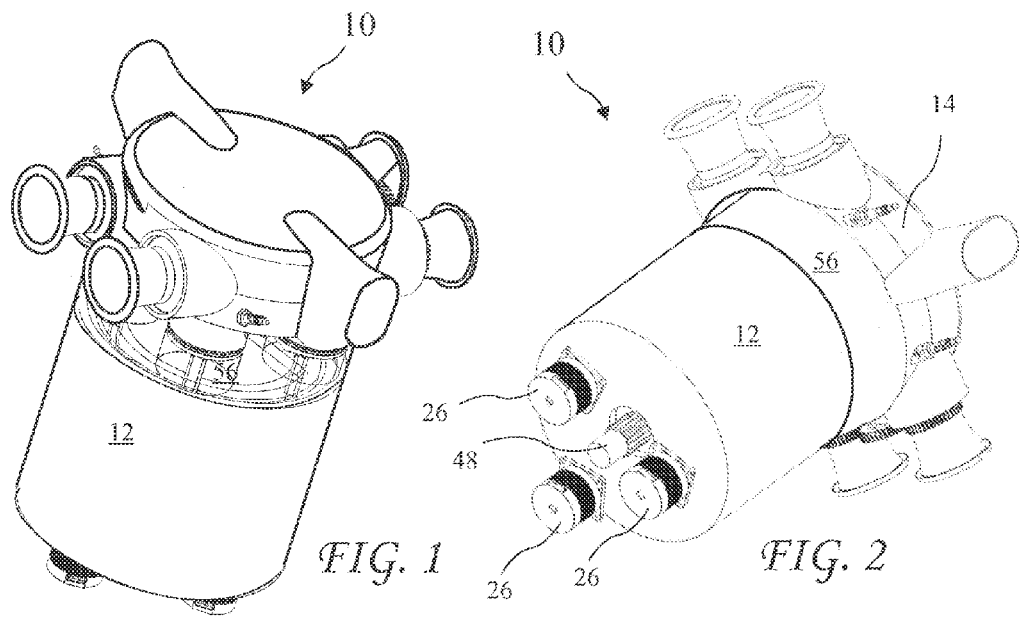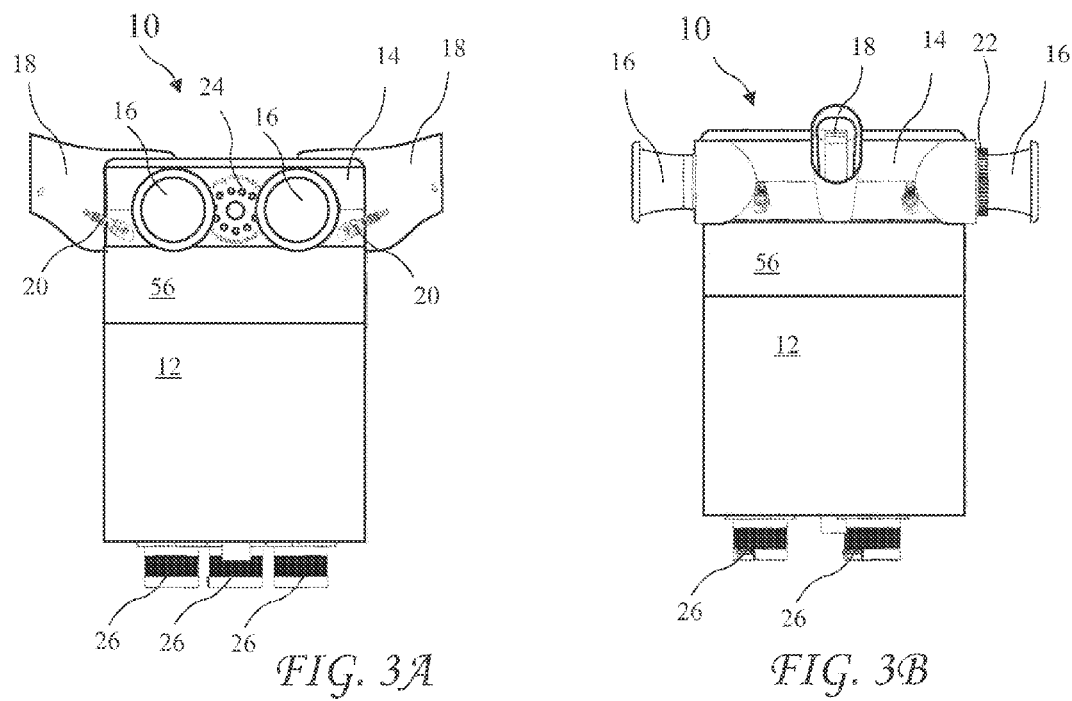

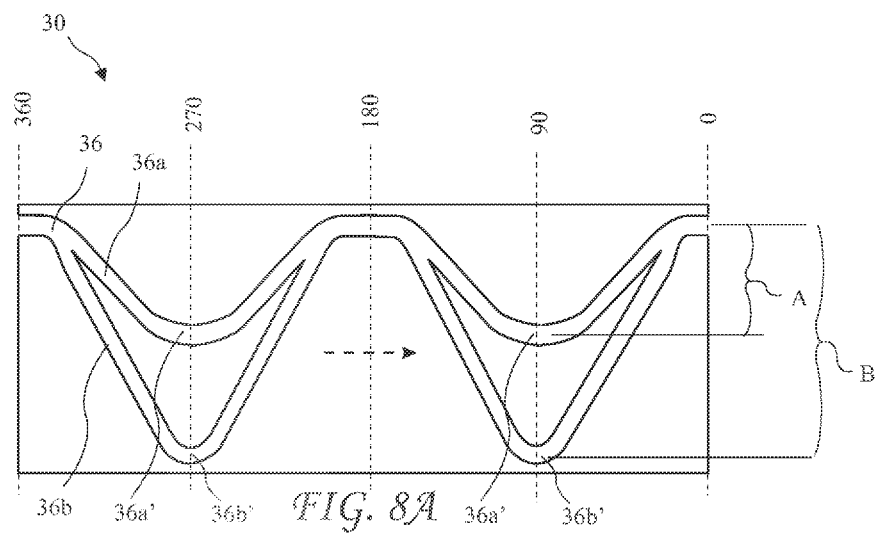
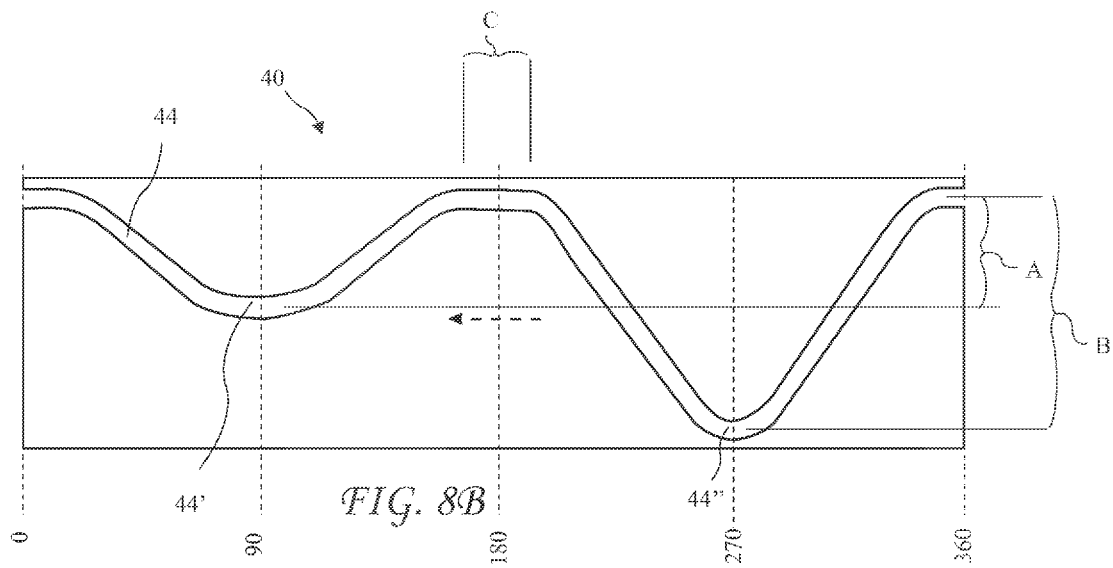

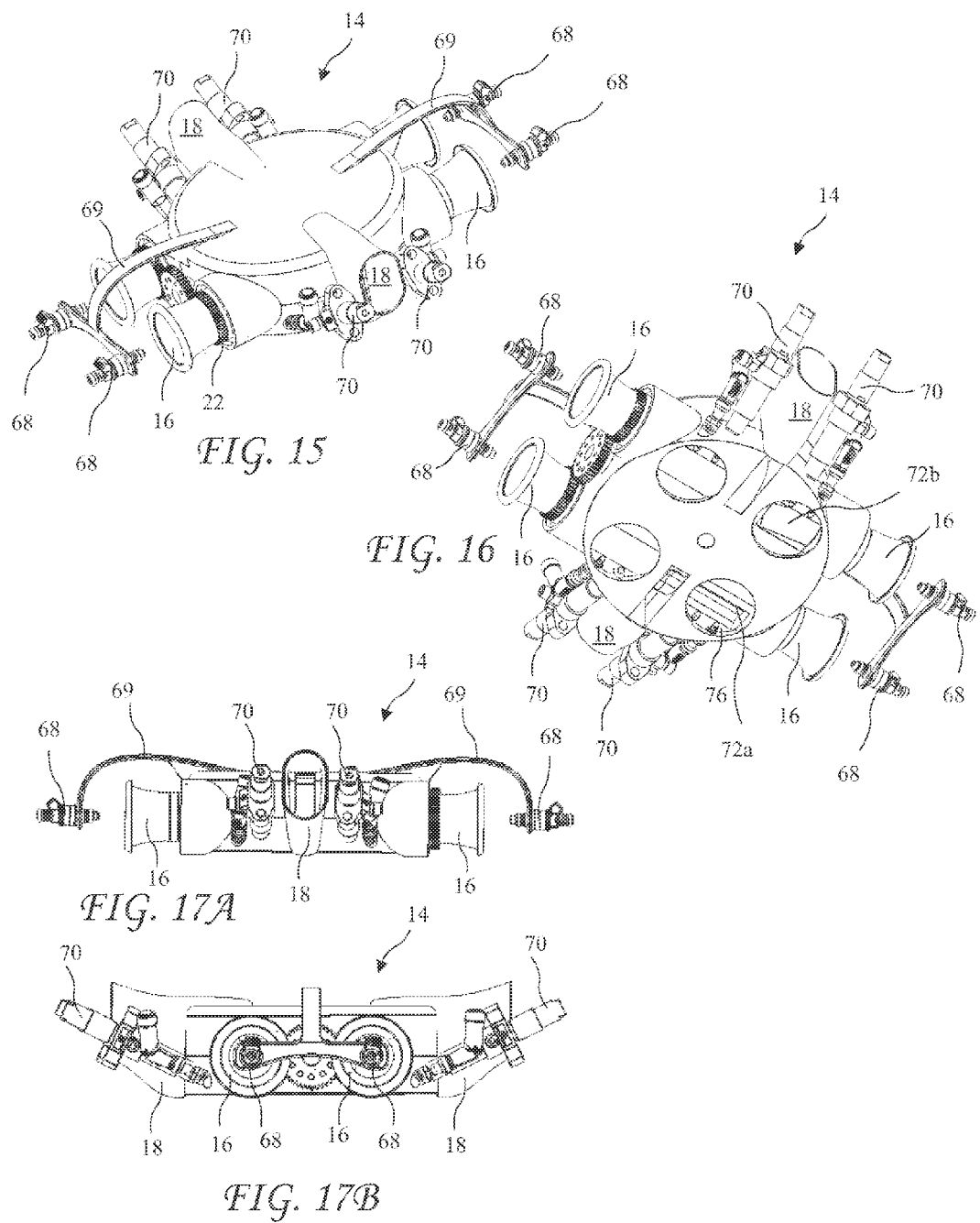

DOUBLE CAM AXIAL ENGINE WITH OVER-EXPANSION, VARIABLE COMPRESSION, CONSTANT VOLUME COMBUSTION, ROTARY VALVES AND WATER INJECTION FOR REGENERATIVE COOLING

CROSS-REFERENCE TO RELATED APPLICATIONS

The present application claims the priority of U.S. Provisional Patent Application Ser. No. 62/123,710 filed Nov. 11, 2014, which application is incorporated in its entirety herein by reference.

BACKGROUND OF THE INVENTION

The present invention relates to internal combustion engines and in particular to a crankless over-expanded variable-compression engine with regenerative internal-cooling using constant-volume combustion and rotary-valves.

The thermodynamic efficiency of an internal combustion engine is strongly related to a compression ratio of the engine. Typical automotive engines have compression ratios of 8.5:1 to 12:1 for street driven automobiles, and sometimes higher for racing engines using special racing fuel in racing conditions. Higher compression ratios for street driven automobiles would increase the thermodynamic efficiency, and thus the gas mileage, but also results in detonation in the combustion chambers of the engines resulting in damage and eventual failure.

The energy distribution chart for a conventional four stroke, Spark Ignition (SI) engine, is about 30 percent usable work, 35 percent into the cooling system (which includes heat generated by friction between moving parts), and 35 percent goes out the exhaust. The first 30 percent corresponds to the engine's overall efficiency, and based on this value, one may assume that it's running at Wide Open Throttle (WOT). Internal Combustion Engines (ICE) are theoretically less efficient at partial throttle settings then when running wide open due to parasitic losses, etc.

Thermodynamic theory suggests, that a heat engine of this type may achieve an efficiency factor of about 60-65 percent at best, but known engines are far from that, and 70 percent of the energy available in a gallon of gasoline is wasted. Automobile manufacturers continue their efforts to improve the situation, and they have been succeeding, as the average miles per gallon has been steadily rising. Improvements include reducing vehicle weight, better aerodynamics, operating hybrid engines at their most efficient speeds, turbo chargers to recapture some of the exhaust's wasted heat, and engines running with higher compression ratios and therefore, more thermodynamically efficient. However, these small incremental changes have become few and far between and more costly.

Known four stroke, spark ignited engine include a series of pistons, in a line, move up and down in cylinder sleeves capped by a header. The pistons connect to a crankshaft, via connecting rods, which controls the piston's motion (stroke). In a first stroke (intake), the crankshaft pulls the piston down, from Top Dead Center (TDC) creating a vacuum inside the corresponding cylinder, and with the intake valve open, draws an Air/Fuel Mixture (AFM) into the cylinder. At Bottom Dead Center (BDC) the cylinder is at its largest volume and the intake valve closes trapping in the ingested AFM. Next, the piston starts up on the second stroke (compression) back to TDC. The compression stroke compresses and heats the AFM according to the physical parameters of the engine. Since the piston's up and down strokes are controlled by the crankshaft, they are all exactly the same length, and the compression ratio is set as a fixed value during the engine's design phase. Compressing the AFM takes a large amount of energy which reduces the power output. To get the maximum amount of energy out of known engines, the AFM half burn must be completed by about 10 degrees of crankshaft rotation after TDC and ignition must take place from 10 to 60 degrees before TDC because the fuel burn takes 20 to 70 degrees of crankshaft rotation to complete. So the AFM is burning before TDC and is getting hotter and pressure in the cylinder is rising over and above that caused by the compression process itself, which increases the negative work.

The third stroke (expansion or power) begins after TDC of the compression stroke. Gas engines are limited in the compression ratio because of a phenomenon called detonation or knock. Detonation occurs because the compression ratio is so high and the combustion chamber wall so hot that the self-ignition temperature of the AFM is reached causing combustion. These are untimed events that often seriously damage the engine. The fourth and final stroke is the exhaust stroke. During the exhaust stroke, upward movement of the piston pushes engine exhaust out through the open exhaust valve. The power stroke is the only stroke which produces mechanical energy, and energy remaining in the cylinder at the end of the power stroke is lost as heat into the exhaust gases.

In summary, most of the energy in a gallon of gasoline is wasted. Even an ideal known SI engine will only recover another third of the energy in the gasoline burned by the engine, two revolutions of the crankshaft are required to produce ½ revolution of power, the piston strokes (all of them) are of equal and fixed length, wasting energy remaining in the cylinder at the end of the power stroke, and higher compression ratios which provide greater thermodynamic efficiency are not possible due to detonation.

BRIEF SUMMARY OF THE INVENTION

The present invention addresses the above and other needs by providing an axial engine which includes a cam assembly housing moveable away from a cylinder head to reduce a compression ratio during conditions giving rise to detonation and movable towards the cylinder head to raise the compression ratio when operation allows the higher compression ratio. Piston rod ends ride in counter rotating slots balancing lateral forces on the piston rods.

In accordance with one aspect of the invention, there is provided an axial engine having counter rotating inner and outer barrel type cams, the inner cam coaxial with and inside the outer cam. The inner and outer cams counter rotate at the same angular speed and are moveable parallel to an engine shaft towards and away from a cylinder head, and the inner and outer cams are radially spaced apart providing room for piston connecting rods. The inner cam and outer cam include inner and outer cam tracks respectively. The cam tracks comprise two walls and a floor, forming a channel for guiding connecting rod cam followers, and the connecting rods include wings on both sides of the cam followers to align the cam followers with the channels and to absorb shear forces imparted to the connecting rod by the counter-rotating cams. The inner cam tracks comprise two diverging-converging, generally sinusoidal channels on the outside surface of the inner cam, one having a greater amplitude than the other, but converging at peaks at 0 deg, 180 degrees and again at 360 degrees. The outer cam track comprises a single generally sinusoidal channel on an inside surface of the outer cam with an intake and compression portion having a lesser amplitude than a power and exhaust portion. The cam tracks face each other and a single cam follower engages both the inner and outer cam tracks simultaneously. Each node includes a near sinusoidal segment of the cam tracks, and corresponding portions of the inner and outer cam tracks are adjacent, allowing the cam followers to simultaneously engage both the inner and the outer cam tracks at all times.

In accordance with another aspect of the invention, the pistons and connecting rods are mounted around an output shaft and move parallel to the output shaft. The parallel configuration results in the piston's components moving in a parallel, linear and reciprocal motion, minimizing piston side loads, friction and vibration.

In accordance with yet another aspect of the invention, there is provided an axial engine providing isochoric (constant volume) combustion. Due to piston dwell at Top Dead Center (TDC), the combustion occurs in a fixed volume during most of the combustion duration. The fixed volume eliminates negative work caused by spark advance in convention Spark Ignition (SI) engines, and also increases combustion efficiency. The dwell at TDC is preferably 10 degrees of Engine Shaft Angle (ESA) but may vary between 0 and 30 degrees of ESA.

In accordance with still another aspect of the invention, there is provided an axial engine providing a variable compression ratio having improved thermodynamic efficiency compared to known engines. The piston and cam assembly is movable towards and away from the cylinder head thus changing the combustion chamber volume at TDC. The variable compression ratio allows the compression ratio to be varied, for example, between 8:1 and 20:1 and anywhere in between during engine operation. The variable compression ratio allows the compression ratio to be increased under light loads providing higher thermodynamic efficiency at the light loads.

In accordance with another aspect of the invention, there is provided an axial engine having an over expansion power stroke. The cam tracks descend farther on the power stroke than on the intake stroke. As result, residual energy residing in the high pressure hot gases inside the cylinder at the end of the power stroke, and normally exhausted, may be used to provide additional shaft work. An example of the expansion and exhaust strokes ratio to the intake and compression strokes is 1.7:1.

In accordance with yet another aspect of the invention, there is provided an axial engine including rotary valves. A modified Bishop rotary valve is used in lieu of the standard poppets. These Bishop rotary valves provide improved volumetric efficiency, optimized turbulence, and much faster opening and closing times. Also, the rotary valve allows much higher compression ratios than those allowed by poppet valves during valve overlap. The Bishop rotary valve design in described in U.S. Pat. No. 4,852,532 issued Aug. 1, 1989, incorporated herein by reference in its entirety.

In accordance with another aspect of the invention, there is provided an axial engine having up to three direct (in-cylinder) water injection cycles and a further possible extra injection into the intake manifold for each cylinder during each four stroke events. A first water injection occurs during compression wherein the water is used to cool the air/fuel mixture. This reduces compression work and allows an increase in the compression ratio. A second water injection takes place during combustion (start of piston dwell at TDC) and is used to cool the combustion process itself. This eliminates the need for Exhaust Gas Recirculation (EGR) and enables higher compression ratios. A third water injection (onto the various walls) takes place during expansion (after combustion occurs) and provides for the internal cooling of the combustion chamber, piston and the rotary valves. This allows for what we call internal regeneration, where part of the heat that would be lost to the engine walls is retrieved to produce work by the expansion of the liquid water into vapor. Also the wall temperature inside the engine will be decreased and controlled by the water fuel ratio and water injection duration. This eliminates hot spots reducing the onset of knock.

The water injection into the intake manifold reduces air temperature and increases its density, increasing volumetric efficiency. The net effect of the total water injection is an increase in fuel efficiency, through compression work reduction, compression ratio increase and regeneration of the heat transferred to the walls. The interior of the combustion walls should be maintained between 250 to 300 degrees Centigrade to provide adequate vapor pressure for the regenerative cooling. The calculated water to fuel ratio is preferably 4.3:1 at idle and 1.4:1 at Wide Open Throttle (WOT) but may vary from 0:1 to 7:1. While this is an open loop process (the water is lost via the exhaust) a substantial amount, up to 66% of the total water in the exhaust, may be recovered and recycled via, for example, a capillary condensation pore process as described in U.S. Pat. No. 8,511,072, issued Aug. 20, 2013 and herein incorporated by reference in its entirety.

In accordance with the combined aspects of the invention, there is provided an axial engine having improved thermodynamic efficiency. A thermodynamic analysis using Converge CFD and MATLAB® SIMULINK® engine models predict an increase in fuel efficiency ranging from 50 percent to 72 percent, achieving a 45 percent mark in overall efficiency. In particular, compared to a conventional SI engine with a 30 percent efficiency at WOT, the axial engine according to the present invention may reach an efficiency of 45 percent, which is a 50 percent improvement, the improvement provided given by water injection (21 percent), Constant Volume Combustion (CVC) (7 percent), over-expansion (12 percent), improved combustion/compression ratio (5 percent), and reduced friction losses (5 percent). Further, compared to a conventional SI engine with a 25 percent efficiency at partial load, the axial engine according to the present invention may reach an efficiency of 43 percent, which is a 72 percent improvement, given by water injection (17 percent), CVC (13 percent), over-expansion (7 percent), improved combustion/compression ratio (27 percent), and reduced friction losses (8 percent). Further, compared to a conventional SI engine, which has a 180 degree power stroke for 720 degrees of output shaft revolution, the axial engine has a 90 degree power stroke for 90 degrees of output shaft revolution.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a top and side perspective view of an axial engine according to the present invention.

FIG. 2 is a bottom and side perspective view of the axial engine according to the present invention.

FIG. 3A is a first side view of the axial engine according to the present invention.

FIG. 3B is a second side view of the axial engine according to the present invention.

FIG. 8A shows an inner cam channel of the axial engine according to the present invention.

FIG. 8B shows an outer cam channel of the axial engine according to the present invention.

FIG. 15 shows a top perspective view of a cylinder head of the axial engine according to the present invention.

FIG. 16 shows a bottom perspective view of the cylinder head of the axial engine according to the present invention.

FIG. 17A shows a first side view of the cylinder head of the axial engine according to the present invention.

FIG. 17B shows a second side view of the cylinder head of the axial engine according to the present invention.

Corresponding reference characters indicate corresponding components throughout the several views of the drawings.

DETAILED DESCRIPTION OF THE INVENTION

Figure 4:
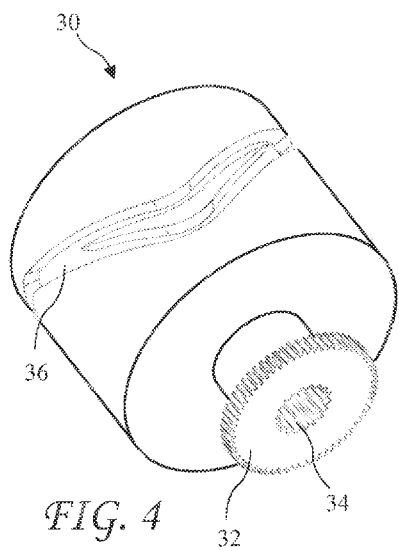
FIG. 4 is a perspective view of an inner cam of the axial engine according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A top and side perspective view of an axial engine 10 according to the present invention is shown in FIG. 1, a bottom and side perspective view of the axial engine 10 is shown in FIG. 2, a first side view of the axial engine 10 is shown in FIG. 3A, and a second side view of the axial engine 10 is shown in FIG. 3B. The axial engine 10 includes a head 14 fixed to a cylinder block 56. An engine housing 12 is fixed to the cylinder block 56 opposite to the head 14. The cylinder head 14 includes air intakes 16, exhaust headers 18, spark plugs 20, and a rotary valve drive gear 24. Other preferred elements of the head 14 are shown in FIGS. 15-18. Servo motors 26 below the engine housing 12 are provided to move a cam assembly 38 (see FIG. 9) towards and away from the cylinder head 14. Such movement of the cam assembly 38 further moves the piston 50 towards and away from the cylinder head 14 thus varying the Compression Ratio (CR).

The CR is the ratio of the volume of the cylinder at Bottom Dead Center (BDC) to the volume at Top Dead Center (TDC) for the compression stroke. Common engines have a fixed CR limited by detonation. Because detonation occurs under known conditions, and generally not under a light load, such as a vehicle at cruising speed, an engine may safely operate at a higher compression ratio under such light loads. Further, a higher CR increases the thermodynamic efficiency of an engine, converting more of the thermal energy produced by combustion into useful mechanical energy. The variable compression ratio of the axial engine 10 may be varied between 8:1 CR and 20:1 CR, increasing the engine's thermodynamic efficiency by as much as 27 percent.

A perspective view of an inner cam 30 of the axial engine 10 is shown in FIG. 4. The inner cam 30 includes an inner cam trajectory (or channel) 36 on a cylindrical outside surface which guides a cam follower 54 (see FIGS. 6 and 8A) at the bottom end of a connecting rod 52. An inner cam shaft spline 34 engages the engine shaft 48 to couple to rotation of the inner cam 30 to valves in the cylinder head 14, and to couple the axial engine 10 to a load. An inner cam gear 32 couples the inner cam 30 to an outer cam 40.

Figure 5:
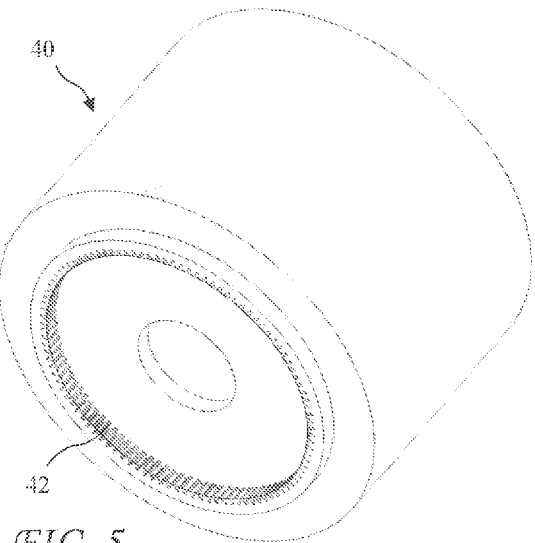
FIG. 5 is a perspective view of an outer cam of the axial engine according to the present invention.

A perspective view of the outer cam 40 of the axial engine according to 10 is shown in FIG. 5. The outer cam 40 includes an outer cam trajectory (or channel) 44 (see FIG. 8B) in a cylindrical inside surface. The inner cam 30 and outer cam 40 counter rotate at the same angular speed and are part of a cam assembly 38 (see FIG. 9) moveable parallel to the engine shaft 48 towards and away from the cylinder head 14.

Figure 6:
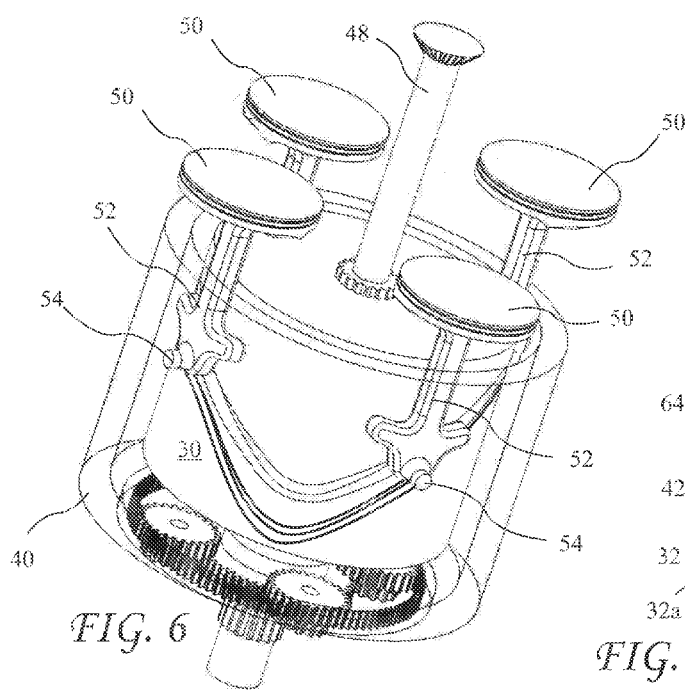
FIG. 6 shows pistons and connecting rods engaging the inner cam of the axial engine according to the present invention.

Pistons 50 and connecting rods 52 engaging the inner cam 30 are shown in FIG. 6. The inner cam 30 and outer cam 40 are radially spaced apart providing room for piston connecting rods 52 between the inner cam 30 and outer cam 40. Cam followers 54 engage both the inner cam channel 36 (see FIG. 8A) and outer cam channel 44 (see FIG. 8B) to transform rotation of the cams into reciprocal motion of the pistons 50, replacing the crankshaft in common engines. The torque applied to the output shaft by the pressure in the combustion chamber is now applied at a 90 degree angle by a fixed length displacement arm defined by the center line of the output shaft 48 and the center line of the connecting rod 52 through 90 degrees of rotation. This is different from the common engine where the effective displacement arm varies from zero to ½ the stroke length and back to zero through 180 degrees of rotation of the crankshaft.

Figure 7:
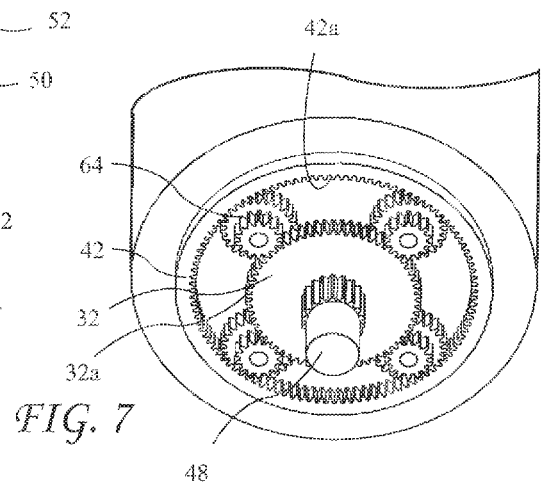
FIG. 7 shows inner and outer cam gears of the axial engine according to the present invention.

The inner cam gear 32 having inside teeth 32a and outer cam gear 42 having inside teeth 42a are shown rotationally coupled by pinion gears 64 in FIG. 7. The arrangement and ratio of the gears 32, 42, and 64 provides the counter rotation of the inner cam 30 and outer cam 40 and couple rotation of the outer cam 40 to the engine shaft 48.

The inner cam channel 36 is shown in FIG. 8A and the outer cam channel 44 is shown in FIG. 8B. Because the expansion and exhaust strokes are longer than the intake and compression strokes, the inner cam channel 36 must split into first inner channel 36a (having node 36a' corresponding to Bottom Dead Center (BDC) on following the intake stroke), and second inner channel 36b (having a node 36b' corresponding to BDC on following the expansion stroke), between Top Dead Center (TDC) events to stay aligned with the outer cam channel 44 (having nodes 44' and 44") through 360 degrees of engine shaft 48 rotation. The nodes 36a' and 44' are aligned and the nodes 36b' and 44" are aligned to concurrently guide the cam followers 54 (see FIG. 6). The cam channels 36 and 44 further include a flat combustion segment C when the pistons 50 are at TDC between the compression and power strokes of the axial engine 10. The segment C provides Constant Volume Combustion (CVC) eliminating negative work produced by combustion produced pressure before TDC in common crankshaft reciprocating engines. The segment C may be between 0 and 30 degrees of Engine Shaft Rotation (ESR) and is preferably about 10 degrees of engine shaft rotation.

The channels 36 and 44 further provide a short stroke A for the compression and intake, and a longer stroke B for exhaust and power strokes. The longer stroke B of the power stroke permits the axial engine 10 to extract more energy from combustion than crankshaft engines which must have same length strokes. An example of a preferred ratio of B to A is 1.7:1.

Figure 9:
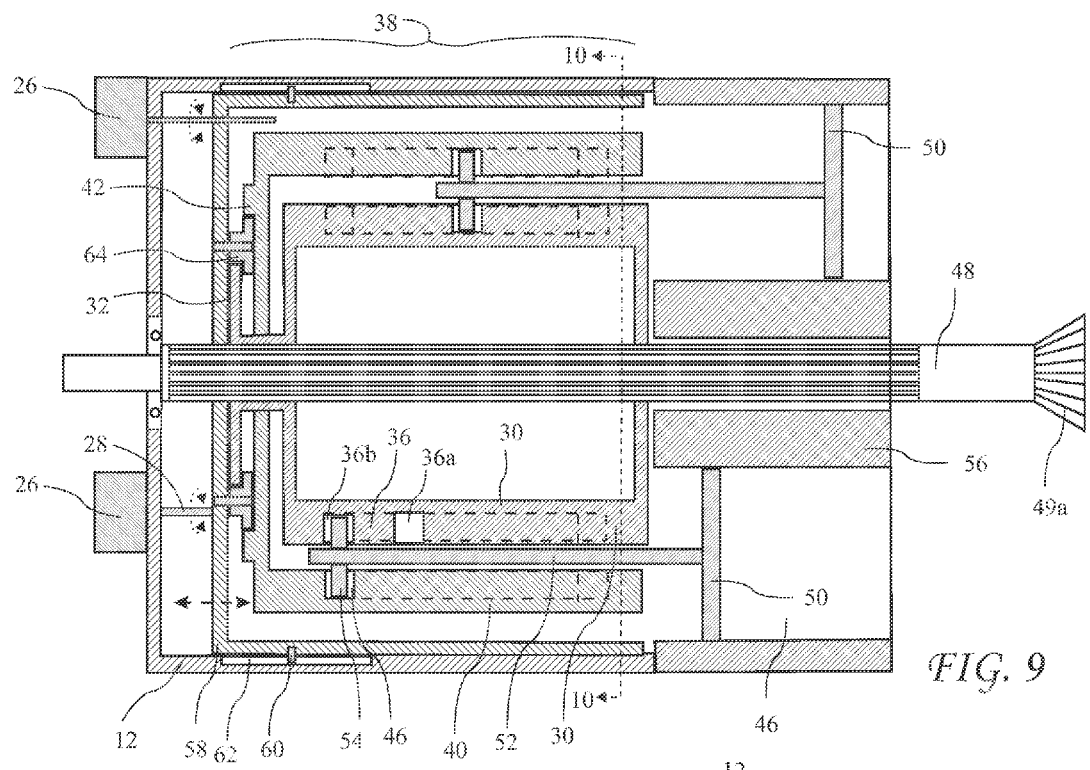
FIG. 9 shows a first cross-sectional view of a cam assembly and block of the axial engine according to the present invention.
Figure 10:
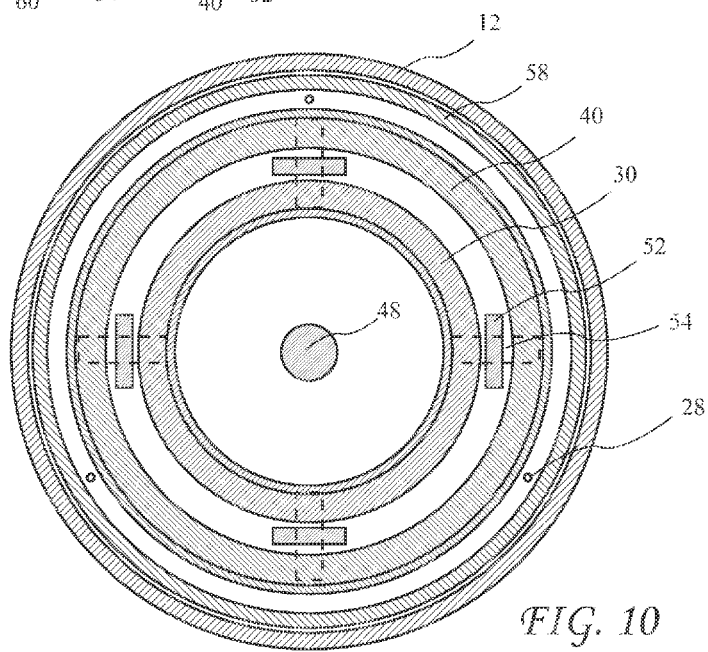
FIG. 10 shows a second cross-sectional view of a cam assembly and block of the axial engine according to the present invention taken along line 10-10 of FIG. 9.

A first cross-sectional view of the cam assembly 38 and cylinder block 56 and cylinder bores 46 of the axial engine 10 is shown in FIG. 9 and a second cross-sectional view of the cam assembly 38 and cylinder block 56 taken along line 10-10 of FIG. 9 is shown in FIG. 10. Servo screws 28 preferably engage the cam casing 58 to move the cam assembly 38 towards and away from the cylinder head 14, but those skilled in the art will recognize various apparatus for moving such structures, and any axial engine moving a cam assembly towards and away from a cylinder head is intended to come within the scope of the present invention. The cam assembly 38 is preferably keyed to the engine housing 12 to resist rotation of the cam assembly 38. The keying may be, for example, by the cooperation of a slot 62 and pin 60, but those skilled in the art will recognize various structure for rotationally coupling such structures, and an axial engine having other rotational coupling is intended to come within the scope of the present invention.

Figure 11:
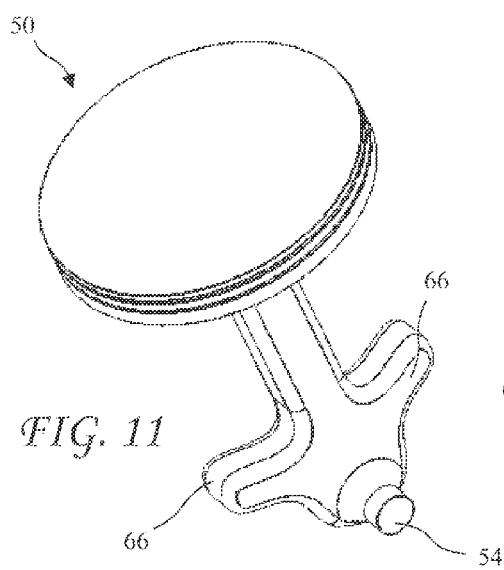
FIG. 11 shows a top perspective view of a piston of the axial engine according to the present invention.
Figure 12:
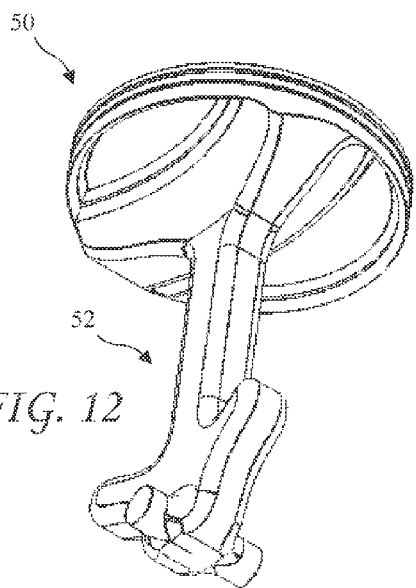
FIG. 12 shows a first bottom perspective view of the piston of the axial engine according to the present invention.
Figures 14A, 14B:
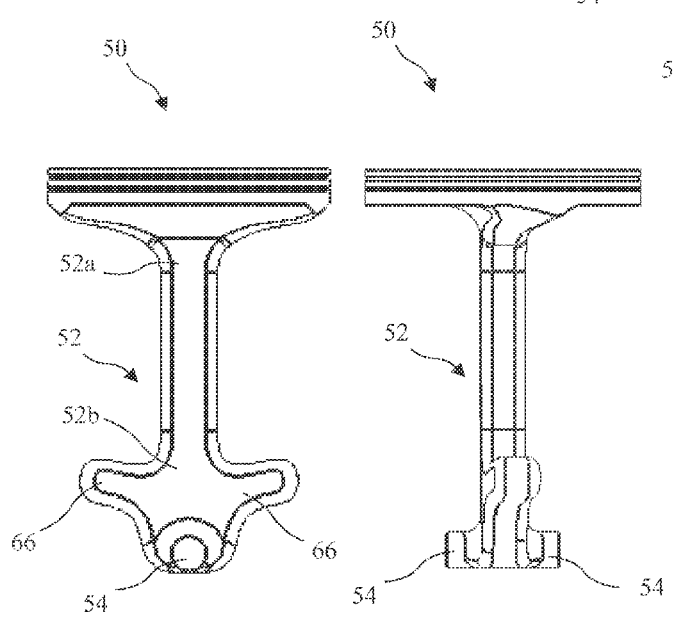
FIG. 14A shows a first side view of the piston of the axial engine according to the present invention.
FIG. 14B shows a second side view of the piston of the axial engine according to the present invention.
Figure 13:
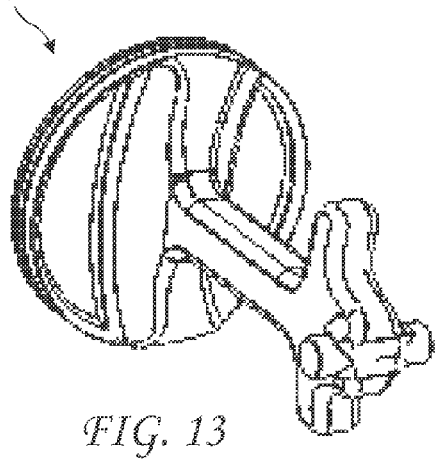
FIG. 13 shows a second bottom perspective view of the piston of the axial engine according to the present invention.

A top perspective view of the piston 50 and connecting rod 52 of the axial engine 10 is shown in FIG. 11, a first bottom perspective view of the piston 50 and connecting rod 52 is shown in FIG. 12, a second bottom perspective view of the piston 50 and connecting rod 52 is shown in FIG. 13, a first side view of the piston 50 and connecting rod 52 is shown in FIG. 14A, and a second side view of the piston 50 and connecting rod 52 is shown in FIG. 14B. The piston 50 and connecting rod 52 are preferably a single piece connecting at the rod top end 52a. The rod bottom end 52b includes both opposing cam followers 54 and wings 66 which slide between the inner cam 30 and outer cam 40 maintaining a proper alignment of the connecting rod 52 and the cam followers.

A top perspective view of the cylinder head 14 of the axial engine 10 is shown in FIG. 15, a bottom perspective view of the cylinder head 14 is shown in FIG. 16, a first side view of the cylinder head 14 is shown in FIG. 17A, and a second side view of the cylinder head 14 is shown in FIG. 17B. The axial engine 10 includes fuel or water injectors 68 and preferably fuel and water injectors 70. The fuel or water injectors 68 may be supported by injector brackets 69 to aim a spray of fuel or water into the air intakes 16 or the fuel injectors 68 may be mounted to the cylinder head 14 and spray into the ports between the air intake 16 and rotary valves 72a and 72b, or may be direct injection fuel and water injectors 70, and spray directly into the combustion chamber 76.

The water injectors 70 preferably spray directly into the combustion chamber 76. The water injection preferably includes three phases per cycle. For example, a first water injection phase may occur during the compression stroke where the water is used to cool the air/fuel mixture. This reduces pressure and as a result, compression work, in the cylinder and allows an increase in the compression ratio. A second water injection phase may occur during combustion (start of the combustion segment C) and is used to cool the combustion process. This eliminates the need for Exhaust Gas Recirculation (EGR) and further enables higher compression ratios. A third water injection phase may occur during expansion (after combustion occurs) and provides for the internal cooling of the combustion chamber 76, piston 50 and the rotary valves 72a and 72b. This allows internal regeneration, where part of the heat that would be lost to the engine walls is retrieved to produce work by the expansion of the liquid water into vapor. Also, the wall temperature inside the engine may be decreased and controlled by the water fuel ratio and water injection duration. This eliminates hot spots reducing the onset of knock. The net effect of the three phases of water injection is an increase in fuel efficiency, through compression work reduction, higher thermodynamic efficiency from compression ratio increase, and regeneration of energy otherwise lost to the heat transferred to the cylinder walls. Combustion chamber surfaces should preferably be between 250 and 300 degrees Centigrade to provide adequate vapor pressure for the regenerative cooling.

The water to fuel ratio may vary from 0:1 to 7:1, and is preferably 4.3:1 at idle and 1.4:1 at Wide Open Throttle (WOT). The water injection may be an open loop process (the water is lost via the exhaust), or a substantial amount, up to 66% of the total water in the exhaust, may be recovered and recycled via, for example, a capillary condensation pore process as described in U.S. Pat. No. 8,511,072, issued Aug. 20, 2013 and herein incorporated by reference above in its entirety.

Figure 18:
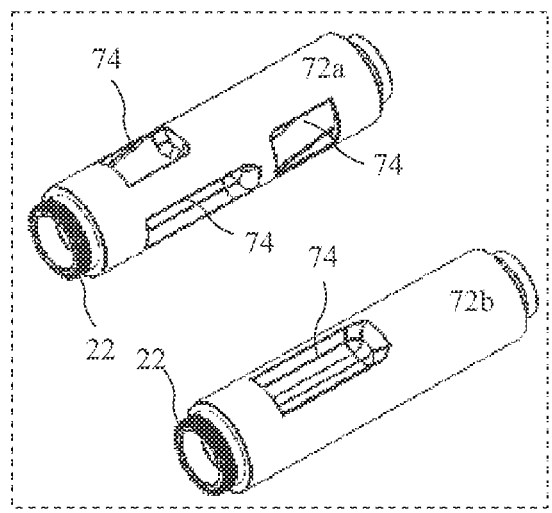
FIG. 18 shows a pair of rotary valves of the axial engine according to the present invention.
Figure 19:
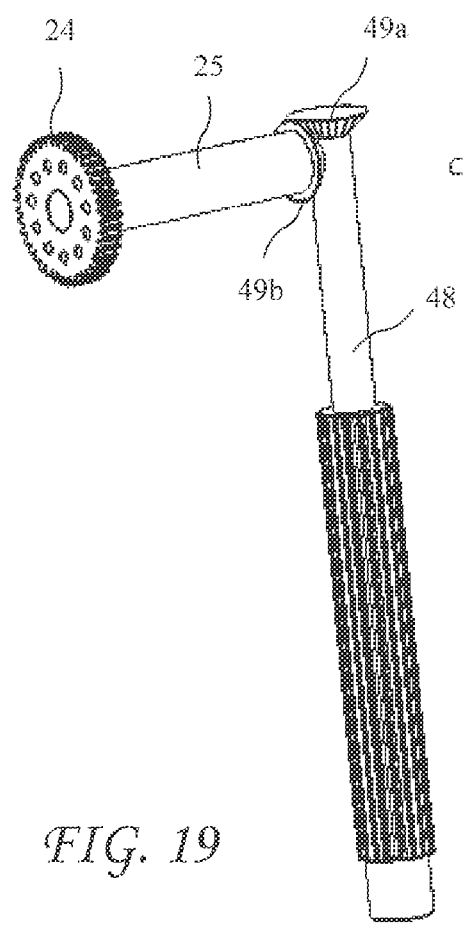
FIG. 19 shows an example of drive structure for the rotary valves according to the present invention.

The axial engine 10 preferably utilizes a rotary valve cylinder head including rotary valves 72a and 72b shown in FIG. 18 and an example of drive structure for the rotary valves 72a and 72b is shown in FIG. 19. The rotary valves 72a and 72b provide fast opening and closing, a simple system without camshafts and/or rockers, and much wider opening than known poppet valves. The rotary valves are cylindrical and rotate at a speed proportional to the engine shaft speed, preferably driven through bevel gears 49a and 49b and the valve gear shaft 25. The rotary valves 72a and 72b include passages 74 connecting the combustion chambers 76 with the air intakes 16 and exhaust headers 18. The instantaneous angular positions of the rotary valves 72a and 72b determining which passages are open to the combustion chambers 76. Each rotary valve 72a and 72b cooperates with two cylinders of the axial engine 10. The intake valve is timed to open at the end of top dwell and to close at the end of bottom dwell to ensure maximum AFM is ingested during the intake stroke. The exhaust valve is timed to open at the beginning of bottom dwell and close at the beginning of top dwell to minimize pumping losses during the exhaust stroke.

An example of a preferred rotary valve is a modified Bishop rotary valve. The Bishop rotary valves provide improved volumetric efficiency, optimized turbulence, and much faster opening and closing times. The Bishop rotary valve design in described in U.S. Pat. No. 4,852,532 issued Aug. 1, 1989, incorporated above by reference in its entirety.

While the invention herein disclosed has been described by means of specific embodiments and applications thereof, numerous modifications and variations could be made thereto by those skilled in the art without departing from the scope of the invention set forth in the claims.

We claim:
1. A variable compression axial engine comprising:
a cylinder block having parallel cylinder bores;
a cylinder head fixed to the cylinder block
an engine housing attached to the cylinder block opposite to the cylinder head;

a cam assembly residing in the engine housing below the cylindrical block and movable in the engine housing towards and away from the cylinder head, the cam assembly including
   a rotating inner cam in the cam assembly and moving towards and away from the cylinder head with the cam assembly; and
   a counter rotating outer cam in the cam assembly residing co-axial outside the inner cam and rotationally coupled to the inner cam by elements of the cam assembly to counter rotate at a same angular velocity as the inner cam, and moving towards and away from the cylinder head with the cam assembly;
a rotating engine shaft parallel to the cylinder bores, the inner cam rotationally coupled to the engine shaft;
an inner cam channel on an outside face of the inner cam;
an outer cam channel on an inner face of the outer cam;
the connecting rods having bottom ends coupled to follow the inner cam channel and the outer cam channel to couple rotational motion of the inner cam and the outer cam to reciprocating motion of the rods;
corresponding portions of the inner channel and outer cam channel are adjacent, and the bottom ends of the connecting rods include cam followers simultaneously engaging both the inner cam channel and the outer cam channel at all times; and
pistons residing at top ends of the connecting rods.

2. The engine of claim 1, further including servos coupling the cam assembly to the engine housing and controllable to move the cam assembly towards and away from the cylinder head.

3. The engine of claim 1, wherein inner cam and the outer cam rotate at the same angular velocity as the engine shaft.

4. The engine of claim 1, wherein:
the inner cam channel and the outer cam channel define four engine strokes comprising:
   an intake stroke wherein the piston moves away from the cylinder head;
   a compression stroke wherein the piston moves towards the cylinder head;
   a power stroke wherein the piston again moves away from the cylinder head; and
   and an exhaust stroke wherein the piston moves towards the cylinder head; and
the power and exhaust strokes are longer than the intake and compression strokes providing over expansion and extracting additional mechanical energy from combustion in the axial engine.

5. The engine of claim 1, wherein:
the inner cam channel and the outer cam channel define four engine strokes comprising:
   an intake stroke wherein the piston moves away from the cylinder head;
   a compression stroke wherein the piston moves towards the cylinder head;
   a power stroke wherein the piston again moves away from the cylinder head; and
   and an exhaust stroke wherein the piston moves towards the cylinder head; and
the inner cam channel and the outer cam channel include a flat portion at Top Dead Center (TDC) between the compression and power strokes providing constant volume combustion.

6. The engine of claim 1, wherein:
the inner cam channel and the outer cam channel define four engine strokes comprising
   an intake stroke wherein the piston moves away from the cylinder head;
   a compression stroke wherein the piston moves towards the cylinder head;
   a power stroke wherein the piston again moves away from the cylinder head; and
   and an exhaust stroke wherein the piston moves towards the cylinder head;
water injection nozzles are in fluid communication with the combustion chambers and directed towards cylinder walls of the cylinder block; and
a water injection system includes timing providing a spray of liquid phase water towards the cylinder walls during the power stroke to extract heat stored in the cylinder walls to convert the liquid phase water to vapor phase water and increase pressure in the cylinder extracting additional mechanical energy from combustion in the axial engine.

7. The engine of claim 1, wherein:
the cylinder head includes rotary valves controlling a flow of air into the engine and a flow of exhaust out of the engine; and
the engine shaft reaches into the cylinder head and engages a valve gear shaft, the valve gear shaft rotationally coupling the engine shaft to the rotary valves.

8. The engine of claim 1, wherein:
the inner cam channel comprises a first inner cam channel and a second inner cam channel, the first inner cam channel and the second inner cam channel being diverging-converging, generally sinusoidal continuous channels spanning 360 degrees of inner cam rotation, the first inner cam channel having two first inner cam channel nodes having lesser amplitude than two second inner cam channel nodes of the second inner cam channel, and the first inner cam channel and the second inner cam channel converging at piston Top Dead Center (TDC) at peaks at 0 deg and 180 degrees, and again at 360 degrees of engine shaft rotation and the first inner cam channel and the second inner cam channel diverging at 90 degrees and 270 degree; and
the outer cam channel includes a first outer cam channel node at 90 degrees and a second outer cam channel node at 270 degrees, the second outer cam channel node having a greater amplitude than the first outer cam channel node, wherein the outer cam channel guides the cam followers to sequentially reside in the first inner cam channel and the second inner cam channel providing a first stoke for intake and compression and a second stroke, longer than the first stroke, for expansion and exhaust.

9. The engine of claim 1, wherein the inner cam channel and the outer cam channel have adjacent generally flat portions and generally sinusoidal curves from 0 to 45 degrees Engine Shaft Angle (ESA), mirrored to 45 to 90 degrees ESA and from 0 to 90 degrees ESA mirrored to 90 to 180 degrees ESA and from 0 to 180 degrees mirrored to 180 to 360 degrees ESA, providing minimal piston cocking, minimal piston side loads, minimal friction and minimal vibration.

10. The engine of claim 9, wherein the generally flat portions correspond with piston Top Dead Center (TDC) between the compression stroke and the power stroke providing constant volume combustion.

11. The engine of claim 1, further including water injection into the engine, the water injection including water injection cycles:
   a first water injection cycle during compression wherein the water cools the air/fuel mixture;

a second water injection during combustion to cool the combustion process; and a third water injection during expansion to extract additional thermal energy lost through the cylinder walls.

12. The engine of claim 11, wherein the water is sprayed against the cylinder wall.

13. The engine of claim 1, wherein the inner cam and the outer cam are coupled by cam gears of the cam assembly.

14. The engine of claim 13, wherein the cam gears comprise:
an inner gear having outside teeth fixed to rotate with the inner cam;
an outer gear having inside teeth fixed to rotate with the outer cam; and
pinion gears coupling the inside gear to the outside gear to provide counter rotation of the inner cam and outer cam.

15. A variable compression axial engine comprising:
a cylinder block having parallel cylinder bores;
a cylinder head fixed to the cylinder block;
pistons reciprocatingly residing in the cylinder bores;
piston rods attached to the pistons, extending down into the cylinder bores, and reciprocating with the pistons
an engine housing attached to the cylinder block opposite to the cylinder head;
a cam assembly residing in the engine housing below the cylindrical block and movable in the engine housing towards and away from the cylinder head;
a rotating inner cam and a rotating outer cam residing coaxially with the inner cam and counter rotating with respect to the inner cam in the cam assembly, the inner cam and the outer cam moving towards and away from the cylinder head with the cam assembly;
a rotating engine shaft parallel to the cylinder bores, the inner cam rotationally coupled to the engine shaft;
the inner cam having an inner cam channel residing on an outside face of the inner cam;
the outer cam having an outer cam channel residing on an inside face for the outer cam, corresponding portions of the inner and outer cam channels are adjacent, bottom ends of the connecting rods include cam followers simultaneously engaging both the inner channel and the outer cam channel at all times;
the inner cam channel and the outer cam channel define four engine strokes comprising:
an intake stroke wherein the piston moves away from the cylinder head;
a compression stroke wherein the piston moves towards the cylinder head;
a power stroke wherein the piston again moves away from the cylinder head; and
and an exhaust stroke wherein the piston moves towards the cylinder head; and
the power and exhaust strokes are longer than the intake and compression strokes providing over expansion and extracting additional mechanical energy from combustion in the axial engine;
connecting rods have bottom ends coupled to follow the inner cam channel and the outer cam channel to convert rotational motion of the inner cam and the outer cam to reciprocating motion of the rods.

16. The engine of claim 15, wherein the inner cam and the outer cam are coupled by cam gears in the cam assembly.

17. A variable compression axial engine comprising:
a cylinder block having parallel cylinder bores;
a cylinder head fixed to the cylinder block
an engine housing attached to the cylinder block opposite to the cylinder head;
a cam assembly residing in the engine housing below the cylindrical block and movable in the engine housing towards and away from the cylinder head;
a rotating inner cam and rotating outer cam in the cam assembly moving towards and away from the cylinder head with the cam assembly;
a rotating engine shaft parallel to the cylinder bores, the rotating cam rotationally coupled to the engine shaft;
the inner cam having an inner cam channel residing on an outside face of the inner cam, the inner cam channel comprise two diverging-converging, generally sinusoidal channels, one having a greater amplitude than the other, and converging at piston Top Dead Center (TDC) at peaks at 0 degrees, 180 degrees and again at 360 degrees of engine shaft rotation;
the outer cam residing coaxially with the inner cam and counter rotating with respect to the inner cam at the same angular velocity as the inner cam, and having an outer cam channel residing on an inside face for the outer cam, corresponding portions of the inner and outer cam channels are adjacent, the bottom ends of the connecting rods include cam followers simultaneously engaging both the inner and the outer cam channels at all times;
the inner channel and the outer channel define four engine strokes comprising:
an intake stroke wherein the piston moves away from the cylinder head;
a compression stroke wherein the piston moves towards the cylinder head;
a power stroke wherein the piston again moves away from the cylinder head; and
and an exhaust stroke wherein the piston moves towards the cylinder head; and
the inner cam channel and the outer cam channel including a generally flat portion at Top Dead Center (TDC) between the compression and power strokes providing constant volume combustion;
connecting rods have bottom ends coupled to follow the channel to convert rotational motion of the cam to reciprocating motion of the rods; and
pistons residing at top ends of the connecting rods.

18. The engine of claim 17, wherein the inner cam and the outer cam are coupled by cam gears in the cam assembly.

* * * * *